United States Patent [19]

Holstein

[11] Patent Number: 4,534,113
[45] Date of Patent: Aug. 13, 1985

[54] LENGTH MEASURING APPARATUS

[75] Inventor: Siegbert Holstein, Stein a.d. Traun, Fed. Rep. of Germany

[73] Assignee: Johannes Heidenhain GmbH, Traunreut, Fed. Rep. of Germany

[21] Appl. No.: 572,167

[22] Filed: Jan. 18, 1984

[30] Foreign Application Priority Data

Jan. 22, 1983 [DE] Fed. Rep. of Germany ....... 3302151

[51] Int. Cl.$^3$ ............................................. G01B 11/04
[52] U.S. Cl. ................................. 33/125 R; 33/125 A
[58] Field of Search ............. 33/125 R, 125 C, 125 T, 33/125 A

[56] References Cited

U.S. PATENT DOCUMENTS

| | | | |
|---|---|---|---|
| 3,816,002 | 6/1974 | Wieg | 33/125 C |
| 4,060,903 | 12/1977 | Ernst | 33/125 R |
| 4,117,439 | 9/1978 | Azzani | 336/129 |
| 4,160,328 | 7/1979 | Ernst | 33/125 R |
| 4,170,826 | 10/1979 | Holstein | 33/125 C |
| 4,170,829 | 10/1979 | Nelle | 33/125 R |

FOREIGN PATENT DOCUMENTS 2911047 3/1979 Fed. Rep. of Germany .
2712421 6/1982 Fed. Rep. of Germany .

Primary Examiner—Willis Little
Attorney, Agent, or Firm—Willian, Brinks, Olds, Hofer, Gilson & Lione

[57] ABSTRACT

A length measuring device which includes a carrier body and a measuring band is provided with fastening components which secure the two ends of the measuring band to respective ends of the carrier body. One of the fastening components is provided with a tensioning device for the measuring band. The other fastening component at the other end of the measuring band is fixed to the measuring band by means of screws. A particular geometry is disclosed which results in a flat, low profile configuration for the second fastening component. Because of the unique shape of the second fastening component, the scanning unit, which is longitudinally slideable in the interior of the carrier body, can be removed from the end of the carrier body past the second fastening component without disassembling or readjusting or disturbing the measuring band. The carrier body can be built up from an array of individual components, in which case the measuring band is preferably held in place only on the outer ends of the two end components. Throughout the length of the carrier body, the measuring band is received freely in a groove defined in the carrier body.

12 Claims, 2 Drawing Figures

LENGTH MEASURING APPARATUS

BACKGROUND OF THE INVENTION

The present invention relates to an improvement for length measuring devices of the type which comprise a carrier body which defines a longitudinal groove extending between two ends of the carrier body, a measuring band which defines two ends and is disposed in the groove, and a scanning unit guided for movement along the measuring band to scan the measuring band and thereby measure the relative position of the scanning unit with respect to the measuring band.

A wide variety of length measuring devices are known to the prior art. For example, the devices disclosed in German Pat. No. 27 12 421 and in U.S. Pat. No. 3,816,002 both include a measuring scale which is realized as a flexible band on which a measuring graduation has been applied. In German Pat. No. 27 12 421 it is disclosed that the measuring band is fastened within a groove in a carrier body shaped to carry the band. This carrier body is secured by means of fastening elements to one of the objects to be measured, such as a machine slide piece for example. In the device shown in U.S. Pat. No. 3,816,002 the measuring band is suspended between two clamping points, and it passes through the scanning unit. In both cases a tensioning device holds the band properly in position.

Frequently, such length measuring devices are used to measure relative displacements, and often they must be attached to appropriate machine components. When such machine components are included in machine tools, operation of the machine tool can generate severe interfering influences related to temperature changes and contamination.

The above described tensioning devices are provided to reduce measurement errors associated with temperature influences. In order to protect against contamination, the measuring devices disclosed above are encapsulated, for example in a sealed hollow body. A further possibility lies in the attachment of the length measuring device at a protected region of the machine tool. However, complete protection against fouling cannot be achieved without raising capital expenditures excessively. For this reason periodic cleaning of the sensitive measuring device is typically required. Such cleaning of the measuring device can be carried out during routine maintenance of the machine tool to which the measuring device is attached.

Depending upon the position in which the length measuring device is attached to the machine and the precise structure of the housing, the disassembly of length measuring devices can represent a major maintenance problem. Thus, by way of example, when the apparatus shown in U.S. Pat. No. 3,816,002 is to be disassembled, the housing has to be opened, the tensioning device of the measuring band has to be released, and then the scanning component has to be removed. Assembly is performed in reverse sequence and in addition the measuring band must be recalibrated and readjusted after assembly has been completed.

SUMMARY OF THE INVENTION

The present invention is directed to an improved length measuring device which is economical to manufacture, which is well protected from adverse environmental interferences, which is easy to maintain, and which is robust in construction.

According to this invention, a length measuring apparatus of the type described initially above is provided with means for fastening one end of the measuring band to one end of the carrier body and means for fastening the other end of the measuring band to the other end of the carrier body. At least one of the fastening means is shaped and positioned to remain entirely outside of the scanning volume occupied by the scanning unit as it moves along the measuring band. In this way, the scanning unit is allowed to move freely past the at least one of the fastening units out of the associated end of the carrier body without disassembly of either of the fastening means.

The present invention provides important advantages in that the entire measuring device can be produced from simple basic components, in that it does not have to be disassembled for purposes of maintenance, and in that any readjustment of the measuring band for reasons of cleaning or maintenance can be dispensed with since the scanning unit is removable from the carrier body without it being necessary to move the measuring scale out of its exactly calibrated position.

The invention itself, together with further objects and attendant advantages, will be best understood by reference to the following detailed description, taken in conjunction with the accompanying drawings.

DETAILED DESCRIPTION OF THE PRESENTLY PREFERRED EMBODIMENTS

Figure 1:
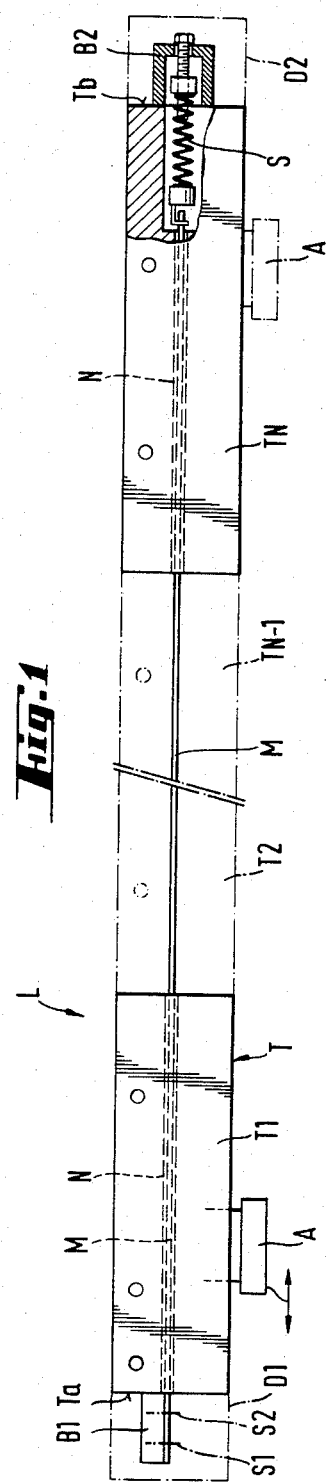
FIG. 1 shows a schematic lengthwise view of a length measuring device which incorporates the presently preferred embodiment of this invention.
Figure 2:
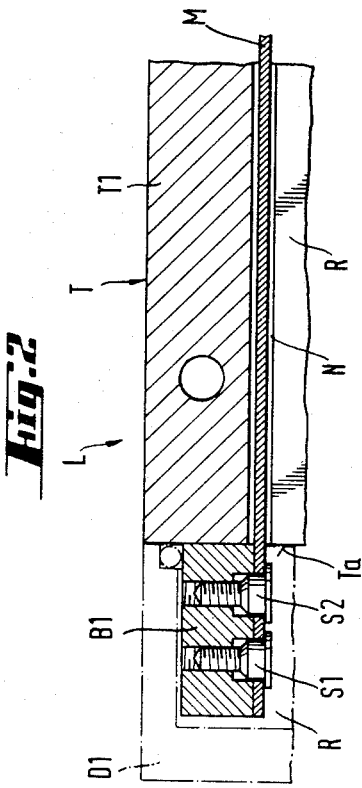
FIG. 2 is a schematic lengthwise view in greater detail of one end of the embodiment of FIG. 1.

Turning now to the drawings, FIGS. 1 and 2 show two views of a length measuring device L. This length measuring device L includes a carrier body T which is made up of an array of individual hollow profile segments T1, T2 ... T(N−1), TN, which are arranged end to end to form the overall carrier body T. In this embodiment, the entire carrier body T is formed of extruded aluminum hollow profiles. The carrier body T defines an inner volume R as well as a groove N at one of its interior surfaces. A measuring scale in the form of a measuring band M is disposed within the groove N in the carrier body T. A scanning unit A is mounted to slide along the measuring band M in the interior and the carrier body T. The scanning unit A scans the measuring band M in order to measure the relative position of the scanning unit A with respect to the measuring band M. A sealed longitudinal slit (not shown in the drawnings) is provided in the carrier body T in order to allow a portion of the scanning unit A to exit from the carrier body T. This portion in the scanning unit A can be fastened to one machine component, and the carrier body T can be fastened to the other machine component in order to measure relative movement between these two machine components.

In FIG. 1, the extreme ends of the carrier body T are denoted by the reference symbols $T_a$ and $T_b$. A fastening component B1, B2 is secured rigidly to each of the ends $T_a$, $T_b$. The measuring band M, which is freely slideable in the groove N of the carrier body T, is fixed to the fastening component B1 by means of screws S1, S2, shown in FIG. 2. The screws S1 and S2 are provided with a particularly flat head which protrudes beyond the measuring band M to a very slight extent. With a suitable selection of materials this fixing of the measuring band M to the fastening component B1 can be accomplished by other means, as for example by spot welding.

As clearly shown in FIG. 2, the fastening component B1 is specially shaped and formed so as not to protrude into the interior space R defined by the carrier body T. In other words, as the scanning unit A moves along the measuring band M it occupies a scanning volume included within the interior volume R of the hollow body T. No part of the fastening component B1 or the screws S1, S2 extends into this scanning volume, and for this reason the scanning unit A can be moved out laterally from the carrier body hollow profile T (to the left as shown in FIGS. 1 and 2) without it being necessary to disassemble either of the fastening components B1, B2 or to disturb in any way the measuring band M. Because of this careful shaping of the fastening component B1, the measuring band M can remain in its exactly calibrated installation position, even when for purposes of maintenance or cleaning it is necessary to remove the scanning unit A from the measuring device L.

In order to clean the measuring band M a cleaning component may be introduced into the carrier body T in place of the scanning unit A. The precise adjustment of the position of the measuring band M is not affected by such a cleaning component.

The second fastening component B2 can be formed in a conventional manner. Preferably, this second scanning component B2 includes an adjustable tensioning device for tensioning the measuring band M and compensating for temperature fluctuations and possible graduation faults and/or machine faults.

The hollow profile of the carrier body T in this embodiment is closed at each end by means of simple covers D1, D2 which are disposed over the respective fastening components B1, B2.

It should be understood that the present invention can be advantageously used not only in the case of encapsulated measuring devices, but also in so called open measuring devices. Frequently, open measuring devices are installed in recesses particularly provided for them on one of the machine components. The maintenance or cleaning problem is then similar to that described above in conjunction with encapsulated measuring devices. For this reason, the advantages of the present invention are important and useful when it is used in conjunction with open measuring devices.

It should be understood that a wide range of changes and modifications to the preferred embodiments described above will be apparent to those skilled in the art. It is therefore intended that the foregoing detailed description be regarded as illustrative rather than limiting, and that it be understood that it is the following claims, including all equivalents, which are intended to define the scope of this invention.

I claim:

1. In a length measuring apparatus of the type comprising a carrier body which defines a longitudinal groove extending between the ends of the carrier body, a measuring band which defines two ends and is disposed in the groove, and a scanning unit guided for movement along the measuring band to scan the measuring band and thereby measure the relative position of the scanning unit with respect to the measuring band, said scanning unit occupying a scanning volume as it moves along the measuring band, the improvement comprising:

means for fastening one end of the measuring band to one end of the carrier body; and means for fastening the other end of the measuring band to the other end of the carrier body;

at least one of the fastening means shaped and positioned to remain entirely outside of the scanning volume and thereby to allow the scanning unit to move past said at least one of the fastening means, past the associated end of the carrier body, without disassembly of said at least one of the fastening means.

2. The invention of claim 1 wherein the carrier body comprises a hollow profile.

3. The invention of claim 2 wherein the carrier body defines are internal volume having a predetermined cross section and wherein said at least one of the fastening means is shaped and positioned to remain entirely outside of said cross section.

4. The invention of claim 1 wherein one of the fastening means comprises means for tensioning the measuring band.

5. The invention of claim 4 wherein the tensioning means is adjustable.

6. The invention of claim 2 further comprising a pair of end covers, each mounted to close a respective end of the hollow profile.

7. The invention of claim 1 wherein the carrier body comprises a plurality of carrier body segments arranged end to end.

8. The invention of claim 7 wherein the plurality of carrier body segments comprises two end segments, and wherein the fastening means are mounted on respective ones of the end segments.

9. The invention of claim 7 wherein the plurality of carrier body segments comprises two end segments and at least one intermediate segment, and wherein the end segments are substantially shorter than the intermediate segment and the total length of the carrier body.

10. The invention of claim 1 wherein the measuring band defines a central region, between the two ends, wherein the central region defines a cross section, and wherein the entire cross section of the central region is disposed within the groove.

11. The invention of claim 1 wherein said at least one fastening means defines an axis extending transverse to the measuring band, and wherein the scanning unit passes over the axis when the scanning unit is moved past the at least one fastening means.

12. The invention of claim 1 wherein the measuring band defines first and second sides, wherein the first side is disposed adjacent to the carrier body, and wherein the at least one of the fastening means is shaped not to extend substantially above the second side.

* * * * *

UNITED STATES PATENT AND TRADEMARK OFFICE
CERTIFICATE OF CORRECTION

PATENT NO. : 4,534,113

DATED : August 13, 1985

INVENTOR(S) : Siegbert Holstein

It is certified that error appears in the above-identified patent and that said Letters Patent is hereby corrected as shown below:

In column 2, line 55 and 56, please delete "drawnings" and substitute therefor --drawings--.

IN THE CLAIMS

In claim 3 (column 4, line 23), please delete "are" and substitute therefore --an--.

Signed and Sealed this

Twenty-second Day of March, 1988

Attest:

DONALD J. QUIGG

Attesting Officer Commissioner of Patents and Trademarks